US008547369B2

(12) United States Patent
Kim et al.

(10) Patent No.: US 8,547,369 B2
(45) Date of Patent: Oct. 1, 2013

(54) ORGANIC LIGHT EMITTING DISPLAY FOR IMPROVING DISPLAY QUALITY AND LIFETIME AND DRIVING METHOD THEREOF

(75) Inventors: Inhwan Kim, Anyang-si (KR); Juhnsuk Yoo, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 493 days.

(21) Appl. No.: 12/875,731

(22) Filed: Sep. 3, 2010

(65) Prior Publication Data

US 2011/0057919 A1 Mar. 10, 2011

(30) Foreign Application Priority Data

Sep. 4, 2009 (KR) ........................ 10-2009-0083677

(51) Int. Cl.
*G06F 3/038* (2013.01)
*G09G 5/00* (2006.01)
*G09G 5/02* (2006.01)

(52) U.S. Cl.
USPC .......................................... 345/209; 345/694

(58) Field of Classification Search
USPC ................................. 345/204–215, 690–699
See application file for complete search history.

(56) References Cited

U.S. PATENT DOCUMENTS

| | | | | |
|---|---|---|---|---|
| 7,911,436 | B2 * | 3/2011 | Lee et al. | 345/100 |
| 2005/0259703 | A1 * | 11/2005 | You et al. | 372/38.07 |
| 2006/0139274 | A1 * | 6/2006 | Song et al. | 345/90 |
| 2008/0197784 | A1 * | 8/2008 | Benzarti | 315/169.3 |

FOREIGN PATENT DOCUMENTS

KR 20080099380 A 11/2008

OTHER PUBLICATIONS

Office Action issued in corresponding Korean Patent Application No. 10-2009-0083677, mailed May 30, 2013, 3 pages.

* cited by examiner

*Primary Examiner* — Ariel Balaoing
*Assistant Examiner* — Larry Sternbane
(74) *Attorney, Agent, or Firm* — Brinks Hofer Gilson & Lione

(57) ABSTRACT

Provided is an organic light emitting display for improving the display quality and lifetime, the organic light emitting display includes a display panel comprising sub pixels disposed at intersections of data lines and first and second scan lines; a data driver alternately outputting a positive data signal and a negative data signal to the data lines; and a scan driver respectively outputting a first scan signal and a second scan signal to the first scan lines and the second scan lines.

10 Claims, 6 Drawing Sheets

ORGANIC LIGHT EMITTING DISPLAY FOR IMPROVING DISPLAY QUALITY AND LIFETIME AND DRIVING METHOD THEREOF

This application claims the benefit of Korean Patent Application No. 10-2009-0083677 filed on Sep. 4, 2009, which is hereby incorporated by reference in its entirety.

BACKGROUND

1. Field

This document relates to an organic light emitting display and a driving method thereof.

2. Related Art

An organic light emitting element used for an organic light emitting display is a self-emitting element having a light emitting layer formed between two electrodes thereof. Organic light emitting displays are classified into a top-emission type, a bottom-emission type, and a dual-emission type according to its light emitting direction and divided into a passive matrix type and an active matrix type according to its driving method.

The organic light emitting display includes a display panel having a plurality of sub pixels arranged in a matrix form, a scan driver that provides scan signals to the display panel, and a data driver that supplies data signals to the display panel. When the scan driver and the data driver respectively provide the scan signals and the data signals to the display panel, selected sub pixels emit light to display an image.

SUMMARY

An organic light emitting display comprises a display panel comprising sub pixels disposed at intersections of data lines and first and second scan lines; a data driver alternately outputting a positive data signal and a negative data signal to the data lines; and a scan driver respectively outputting a first scan signal and a second scan signal to the first scan lines and the second scan lines.

In another aspect, a method of driving an organic light emitting display comprises driving a scan driver to provide a first scan signal and a second scan signal to a display panel including sub pixels disposed at intersections of first scan lines and second scan lines; and driving a data driver to alternately provide a positive data signal and a negative data signal to data lines connected to the sub pixels, wherein the data driver divides one horizontal period in half and alternately generates the positive data signal and the negative data signal such that the positive data signal corresponds to the first half period and the negative data signal corresponds to the second half period.

BRIEF DESCRIPTION OF THE DRAWINGS

The implementation of this document will be described in detail with reference to the following drawings in which like numerals refer to like elements.

DETAILED DESCRIPTION

Hereinafter, implementations of this document will be described in detail with reference to the attached drawings.

Figure 1:
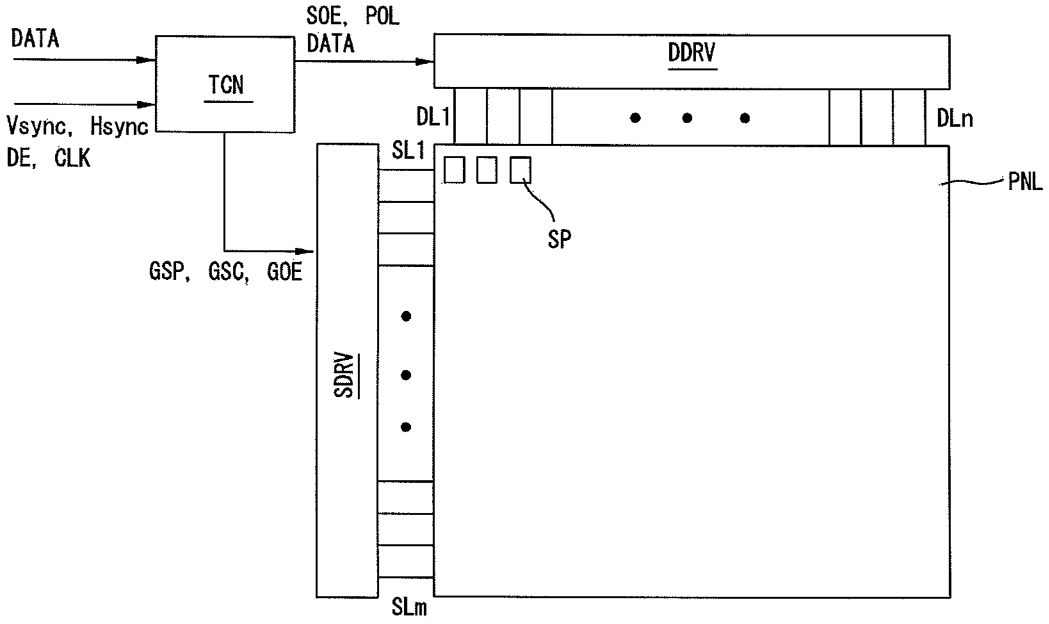
FIG. 1 is a schematic diagram of an organic light emitting display.
Figure 2:
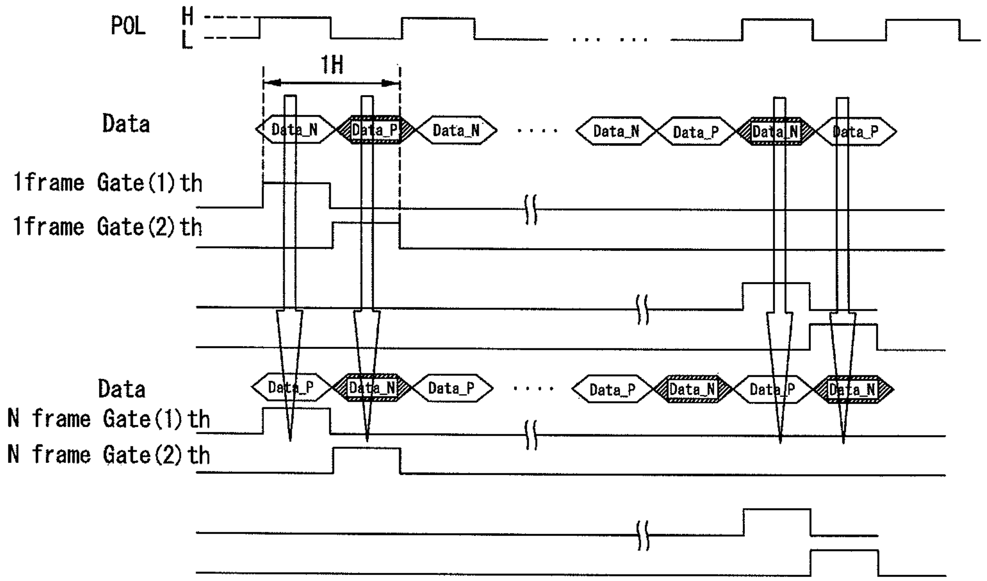
FIG. 2 is a waveform diagram of signals output from a data driver and a scan driver.

Referring to FIGS. 1 and 2, an organic light emitting display comprises a timing driver TCN, a display panel PNL, a data driver DDRV, and a scan driver SDRV.

The timing driver TCN generates a driving signal including data control signals (including a source output enable signal SOE and a polarity signal POL) for controlling the data driver DDRV and a gate signal including gate timing signals GSP, GSC and GOE for controlling the operating timing of the scan driver SDRV by using digital video data DATA, a vertical synchronization signal Vsync, a horizontal synchronization signal Hsync, a data enable signal DE, and a clock signal CLK, which are supplied from external devices.

The display panel PNL comprises sub pixels SP arranged in a matrix form at intersections of data lines DL1 through DLn and scan lines SL1 through SLm. The sub pixels SP may emit red, green and blue lights. However, the sub pixels SP are not limited thereto.

The data driver DDRV samples and latches the digital video data DATA input from the timing controller TCN in response to the driving signal SOE and POL output from the timing controller TCN to convert the digital video data DATA into parallel data. The data driver DDRV transforms the parallel data into positive/negative analog video data using a gamma reference voltage. The data driver DDRV alternately generates a positive data signal Data_P and a negative data signal Data_N corresponding to the polarity signal POL including a positive signal POL_H and a negative signal POLL for one horizontal period 1H. The data driver DDRV divides one horizontal period 1H in half and generates a data signal alternating between the positive data signal Data_P and the negative data signal Data_N for the two half periods such that the positive data signal Data_P corresponds to the first half period and the negative data signal Data_N corresponds to the second half period. The data driver DDRV outputs the data signal alternating between the positive data signal Data_P and the negative data signal Data_N to the data lines DL1 through DLn in response to the source output enable signal SOE. The data driver DDRV generates the data signal such that the polarity of the data signal is reversed for every frame. For example, a data signal output for an odd frame period alternates between the positive data signal Data_P and the negative data signal Data_N while a data signal output for an even frame period alternates between the negative data signal Data_N and the positive data signal Data_P. While FIG. 2 shows that the negative data signal Data_N is output first and positive data signal Data_P is output, the negative data signal Data_N may follow the positive data signal Data_P. When the data signal is output in the aforementioned manner, the sub pixels SP receive the positive data signal Data_P (or negative data signal Data_N) and the negative data signal Data_N (or positive data signal Data_P).

The scan driver SDRV generates a first scan signal Gate[1]th and a second scan signal Gate[2]th respectively corresponding to a positive signal and a negative signal in one horizontal period 1H in response to the gate signals GSP, GSC and GOE output from the timing driver TCN. The scan driver SDRV divides one horizontal period 1H in half and respectively outputs the first scan signal Gate[1]th and the second scan signal Gate[2]th respectively corresponding to the positive signal and the negative signal to the first scan line SL1 and the second scan line SL2 according to the gate output enable signal GOE. Here, the first and second scan signals Gate[1]th and Gate[2]th are sequentially output to the first and second scan lines SL1 and SL2 through the (m−1)th and mth scan lines SL(m−1) and SLm. The period in which the first scan signal Gate[1]th is supplied may be defined as an odd scan period and the period in which the second scan signal Gate [2]th is provided may be defined as an even scan period. When the scan signals are output in the aforementioned manner, a single sub pixel receives the first scan signal having a logic high (or logic low) level through the first scan line SL1 for the odd frame period and receives the second scan signal having a logic low (or logic high) level through the second scan line SL2 in the even frame period.

Light emitting states of the display panel PNL according to data signals output from the data driver DDRV will now be explained.

Figure 3:
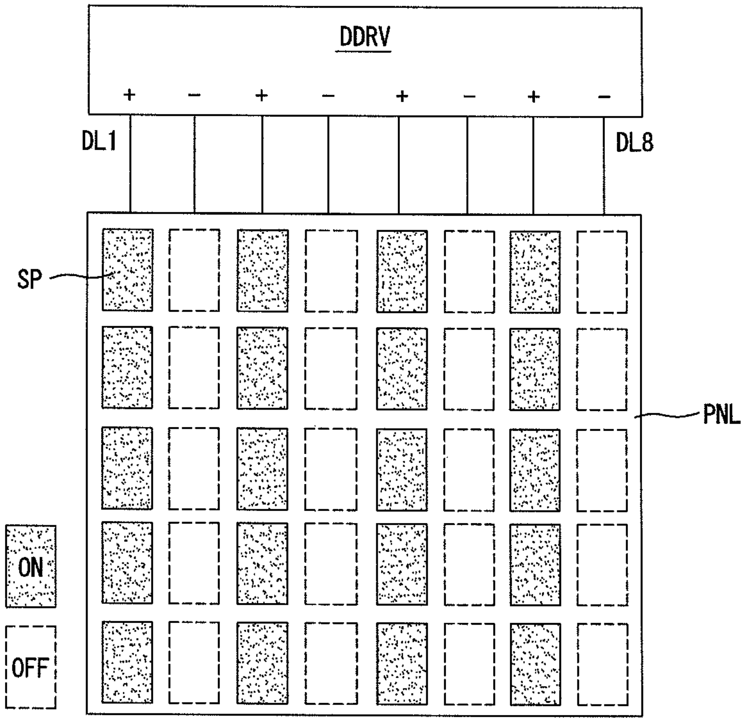
FIGS. 3 and 4 illustrate light emitting states of a display panel according to data signals output from the data driver.

Referring to FIG. 3, the data driver DDRV supplies a data signal alternating between a positive data signal (+) and a negative data signal (−) to the first through eighth data lines DL1 through DL8 such that the positive data signal (+) is provided to odd-numbered data lines DL1, DL3, DL5 and DL7 and the negative data signal (−) is supplied to even-numbered data lines DL2, DL4, DL6 and DL8. Then, sub pixels SP that receive the positive data signal (+) through the first, third, fifth and seventh data lines DL1, DL3, DL5 and DL7 emit lights. On the other hand, sub pixels SP that receive the negative data signal (−) through the second, fourth, sixth and eighth data lines DL2, DL4, DL6 and DL8 do not emit lights.

Figure 4:
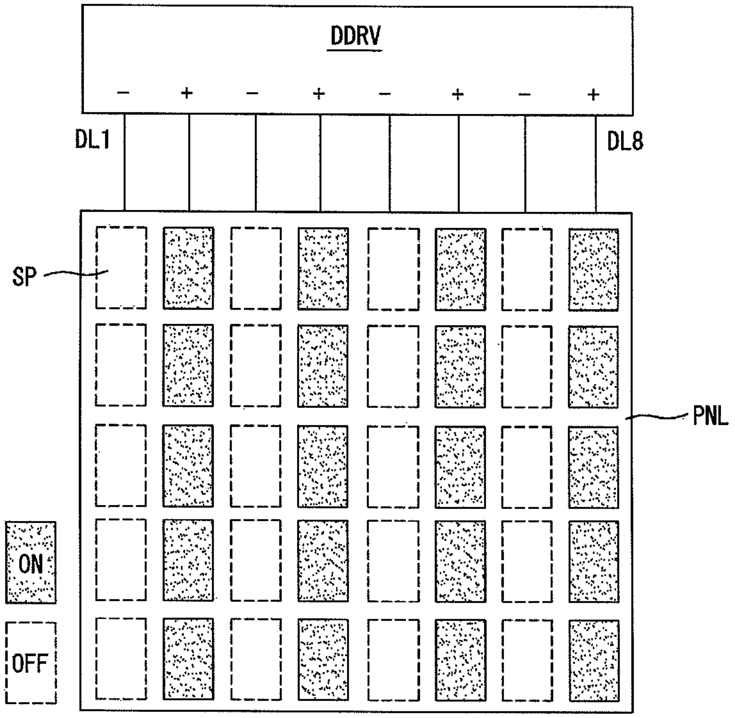

Referring to FIG. 4, the data driver DDRV supplies a data signal alternating between the negative data signal (−) and the positive data signal (+) to the first through eighth data lines DL1 through DL8 such that the negative data signal (−) is provided to odd-numbered data lines DL1, DL3, DL5, DL7 and the positive data signal (+) is supplied to even-numbered data lines DL2 DL4, DL6 and DL8. Then, sub pixels SP that receive the negative data signal (−) through the first, third, fifth and seventh data lines DL1, DL3, DL5 and DL7 do not emit lights. On the other hand, sub pixels SP that receive the positive data signal (+) through the second, fourth, sixth and eighth data lines DL2, DL4, DL6 and DL8 emit lights.

A circuit configuration of the sub pixels SP arranged in the display panel of the organic light emitting display shown in FIG. 1 will now be explained in detail.

Figure 5:
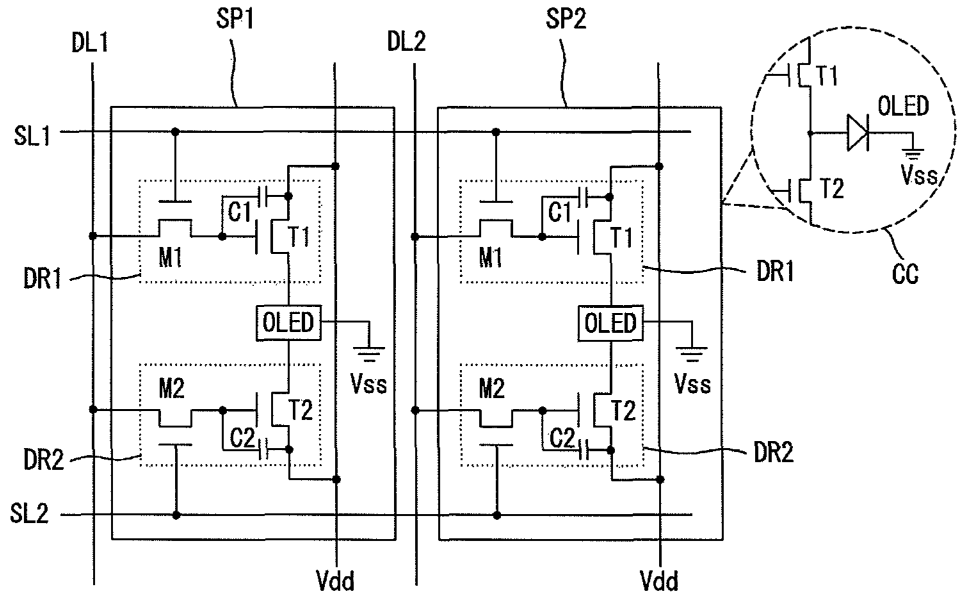
FIG. 5 is a circuit diagram of the organic light emitting display shown in FIG. 1.

Referring to FIG. 5, each of first and second sub pixels SP1 and SP2 comprised in the organic light emitting display comprises a first pixel driver DR1 and a second pixel driver DR2. The first pixel driver DR1 and the second pixel driver DR2 share a single organic light emitting diode OLED, which is represented by “CC”.

The first pixel driver DR1 comprises a first switching transistor M1, a first driving transistor T1 and a first capacitor C1. A gate electrode of the first switching transistor M1 is connected to the first scan line SL1, a source electrode thereof is connected to the first data line DL1 and a drain electrode thereof is connected to a first terminal of the first capacitor C1. A gate electrode of the first driving transistor T1 is connected to the first terminal of the first capacitor C1, a source electrode thereof is connected to a first power supply line Vdd and a drain electrode thereof is connected to an anode of the organic light emitting diode OLED. The first terminal of the first capacitor C1 is connected to the gate electrode of the first driving transistor T1 and a second terminal thereof is connected to the first power supply line Vdd. The anode of the organic light emitting diode OLED is connected to the drain electrode of the first driving transistor T1 and a cathode thereof is connected to a second power supply line Vss.

The second pixel driver DR2 comprises a second switching transistor M2, a second driving transistor T2 and a second capacitor C2. A gate electrode of the second switching transistor M2 is connected to the second scan line SL2, a source electrode thereof is connected to the first data line DL1 and a drain electrode thereof is connected to a first terminal of the second capacitor C2. A gate electrode of the second driving transistor T2 is connected to the first terminal of the second capacitor C2, a source electrode thereof is connected to the first power supply line Vdd and a drain electrode thereof is connected to the anode of the organic light emitting diode OLED. The first terminal of the second capacitor C2 is connected to the gate electrode of the second driving transistor T2 and a second terminal thereof is connected to the first power supply line Vdd. The anode of the organic light emitting diode OLED is connected to the drain electrode of the second driving transistor T2 and the cathode thereof is connected to the second power supply line Vss.

The operations of the first and second sub pixels SP1 and SP2 will now be explained with reference to FIGS. 6 and 7.

Figure 6:
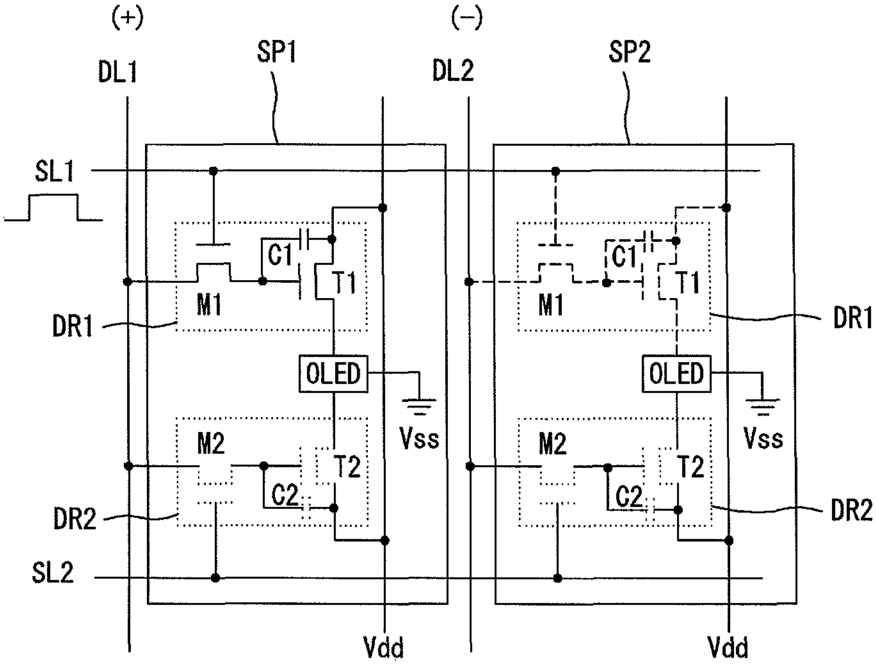
FIGS. 6 and 7 are circuit diagrams for illustrating exemplary operations of the organic light emitting display shown in FIG. 5.

FIG. 6 is a circuit diagram for explaining an operating state when a logic high scan signal is provided to the first scan line SL1 and a logic low scan signal is supplied to the second scan line SL2, which may be defined as an odd frame period.

For the odd frame period, the first sub pixel SP1 receives a positive data signal (+) through the first data line DL1 and the second sub pixel SP2 receives a negative data signal (−) through the second data line DL2.

The first switching transistor M1 comprised in the first pixel driver DR1 of the first sub pixel SP1 is turned on in response to the logic high scan signal provided through the first scan line SL1. Then, the positive data signal (+) supplied through the first data line DL1 is transferred through the first switching transistor M1 and stored as a positive data voltage in the first capacitor C1. Here, the second switching transistor M2 comprised in the second pixel driver DR2 of the first sub pixel SP1 is turned off in response to the logic low scan signal provided through the second scan line SL2. When the first switching transistor M1 comprised in the first pixel driver DR1 of the first sub pixel SP1 is turned off, the positive data voltage stored in the first capacitor C1 is provided to the gate electrode of the first driving transistor T1. Accordingly, the first driving transistor T1 is operated in response to the positive data voltage, and thus the organic light emitting diode OLED emits light.

The first switching transistor M1 comprised in the first pixel driver DR1 of the second sub pixel SP2 is turned on in response to the logic high scan signal provided through the first scan line SL1. Then, the negative data signal (−) supplied through the second data line DL2 is transferred through the first switching transistor M1 and stored as a negative data voltage in the first capacitor C1. Here, the second switching transistor M2 comprised in the second pixel driver DR2 of the second sub pixel SP2 is turned off in response to the logic low scan signal provided through the second scan line SL2. When the first switching transistor M1 comprised in the first pixel driver DR1 of the second sub pixel SP1 is turned off, the negative data voltage stored in the first capacitor C1 is provided to the gate electrode of the first driving transistor T1. Accordingly, the first driving transistor T1 compensates for the threshold voltage thereof in response to the negative data voltage and the organic light emitting diode OLED does not emit light.

That is, the first sub pixel SP1 performs a light-emitting operation according to the first pixel driver DR1 thereof and the second sub pixel SP2 performs a compensation operation according to the first pixel driver DR1 thereof in the odd frame period.

Figure 7:
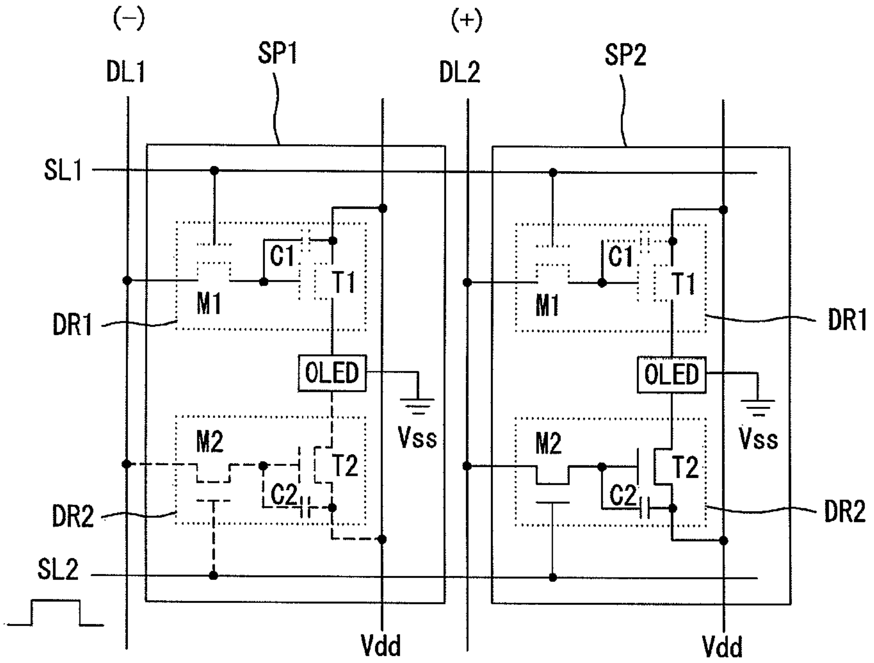

FIG. 7 is a circuit diagram for explaining an operating state when a logic low scan signal is supplied to the first scan line SL1 and a logic high scan signal is provided to the second scan line SL2, which may be defined as an even frame period.

For the even frame period, the first sub pixel SP1 receives the negative data signal (−) through the first data line DL1 and the second sub pixel SP2 receives the positive data signal (+) through the second data line DL2.

The first switching transistor M1 comprised in the first pixel driver DR1 of the first sub pixel SP1 is turned off in response to the logic low scan signal provided through the first scan line SL1 whereas the second switching transistor M2 comprised in the second pixel driver DR2 of the first sub pixel SP1 is turned on in response to the logic high scan signal provided through the second scan line SL2. Then, the negative data signal (−) supplied through the first data line DL1 is transferred through the second switching transistor M2 and stored as a negative data voltage in the second capacitor C2. When the second switching transistor M2 comprised in the second pixel driver DR2 of the first sub pixel SP1 is turned off, the negative data voltage stored in the second capacitor C2 is provided to the gate electrode of the second driving transistor T2. Accordingly, the second driving transistor T2 compensates for the threshold voltage thereof in response to the negative data voltage and the organic light emitting diode OLED does not emit light.

The first switching transistor M1 comprised in the first pixel driver DR1 of the second sub pixel SP2 is turned off in response to the logic low scan signal provided through the first scan line SL1 whereas the second switching transistor M2 comprised in the second pixel driver DR2 of the second sub pixel SP2 is turned on in response to the logic high scan signal provided through the second scan line SL2. Then, the positive data signal (+) supplied through the second data line DL2 is transferred through the second switching transistor M2 and stored as a positive data voltage in the second capacitor C2. When the second switching transistor M2 comprised in the second pixel driver DR2 of the second sub pixel SP2 is turned off, the positive data voltage stored in the second capacitor C2 is provided to the gate electrode of the second driving transistor T2. Accordingly, the second driving transistor T2 is operated in response to the positive data voltage, and thus the organic light emitting diode OLED emits light.

That is, the first sub pixel SP1 performs a compensation operation according to the second pixel driver DR2 thereof and the second sub pixel SP2 performs a light-emitting operation according to the second pixel driver DR2 thereof in the even frame period.

Figure 8:
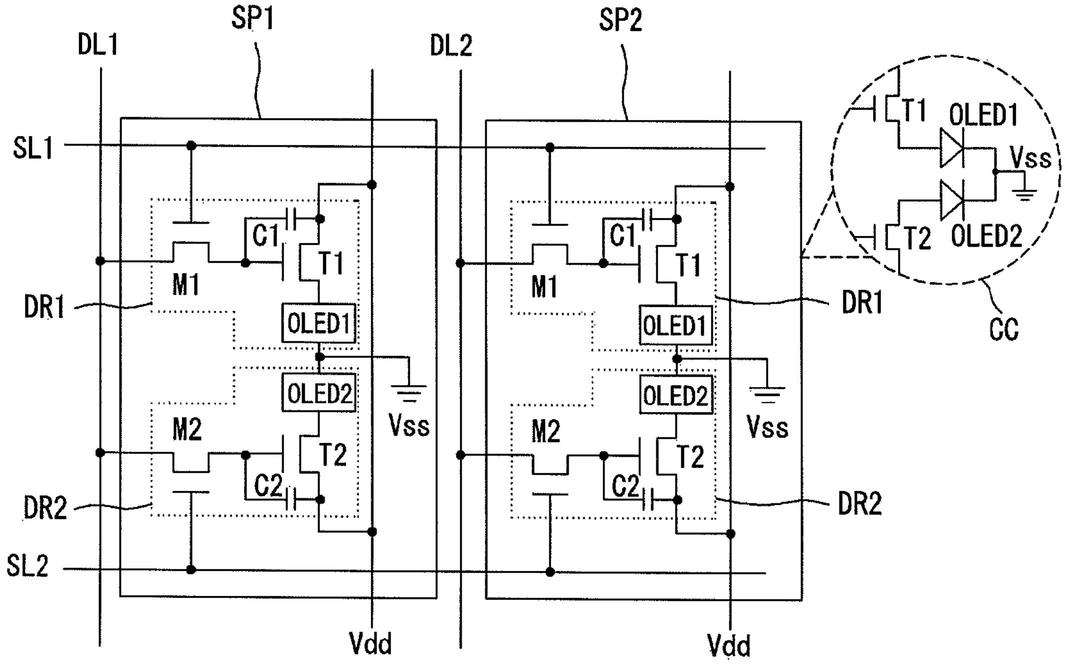
FIG. 8 is a circuit diagram of an alternative organic light emitting display.

Referring to FIG. 8, each of first and second sub pixels SP1 and SP2 comprised in an alternative organic light emitting display comprises a first pixel driver DR1 and a second pixel driver DR2. The first pixel driver DR1 and the second pixel driver DR2 are configured to respectively drive a first organic light emitting diode OLED1 and a second organic light emitting diode OLED2, as represented by "CC". The first and second organic light emitting diodes OLED1 and OLED2 share the cathode thereof.

The first pixel driver DR1 comprises a first switching transistor M1, a first driving transistor T1, a first capacitor C1 and the first organic light emitting diode OLED1. A gate electrode of the first switching transistor M1 is connected to the first scan line SL1, a source electrode thereof is connected to the first data line DL1 and a drain electrode thereof is connected to a first terminal of the first capacitor C1. A gate electrode of the first driving transistor T1 is connected to the first terminal of the first capacitor C1, a source electrode thereof is connected to a first power supply line Vdd and a drain electrode thereof is connected to an anode of the first organic light emitting diode OLED1. The first terminal of the first capacitor C1 is connected to the gate electrode of the first driving transistor T1 and a second terminal thereof is connected to the first power supply line Vdd. The anode of the first organic light emitting diode OLED1 is connected to the drain electrode of the first driving transistor T1 and the cathode thereof is connected to a second power supply line Vss.

The second pixel driver DR2 comprises a second switching transistor M2, a second driving transistor T2, a second capacitor C2, and a second organic light emitting diode OLED2. A gate electrode of the second switching transistor M2 is connected to the second scan line SL2, a source electrode thereof is connected to the first data line DL1 and a drain electrode thereof is connected to a first terminal of the second capacitor C2. A gate electrode of the second driving transistor T2 is connected to the first terminal of the second capacitor C2, a source electrode thereof is connected to the first power supply line Vdd and a drain electrode thereof is connected to the anode of the second organic light emitting diode OLED2. The first terminal of the second capacitor C2 is connected to the gate electrode of the second driving transistor T2 and a second terminal thereof is connected to the first power supply line Vdd. The anode of the second organic light emitting diode OLED2 is connected to the drain electrode of the second driving transistor T2 and the cathode thereof is connected to the second power supply line Vss.

The operations of the first and second sub pixels SP1 and SP2 will now be explained with reference to FIGS. 9 and 10.

Figure 9:
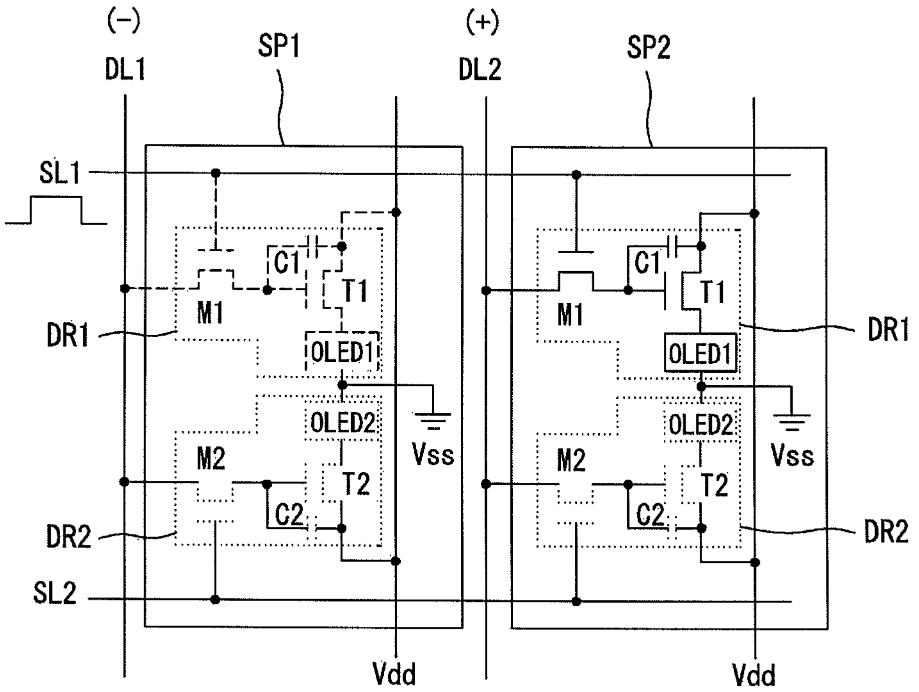
FIGS. 9 and 10 are circuit diagrams for illustrating exemplary operations of the operation of the organic light emitting display shown in FIG. 8.

FIG. 9 is a circuit diagram for explaining an operating state when a logic high scan signal is provided to the first scan line SL1 and a logic low scan signal is supplied to the second scan line SL2, which may be defined as an odd frame period.

For the odd frame period, the first sub pixel SP1 receives a negative data signal (−) through the first data line DL1 and the second sub pixel SP2 receives a positive data signal (+) through the second data line DL2.

The first switching transistor M1 comprised in the first pixel driver DR1 of the first sub pixel SP1 is turned on in response to the logic high scan signal provided through the first scan line SL1. Then, the negative data signal (−) supplied through the first data line DL1 is transferred through the first switching transistor M1 and stored as a negative data voltage in the first capacitor C1. Here, the second switching transistor M2 comprised in the second pixel driver DR2 of the first sub pixel SP1 is turned off in response to the logic low scan signal provided through the second scan line SL2. When the first switching transistor M1 comprised in the first pixel driver DR1 of the first sub pixel SP1 is turned off, the negative data voltage stored in the first capacitor C1 is provided to the gate electrode of the first driving transistor T1. Accordingly, the first driving transistor T1 comprised in the first pixel driver DR1 compensates for the threshold voltage thereof in response to the negative data voltage and the first organic light emitting diode OLED1 does not emit light.

The first switching transistor M1 comprised in the first pixel driver DR1 of the second sub pixel SP2 is turned on in response to the logic high scan signal provided through the first scan line SL1. Then, the positive data signal (+) supplied through the second data line DL2 is transferred through the first switching transistor M1 and stored as a positive data voltage in the first capacitor C1. Here, the second switching transistor M2 comprised in the second pixel driver DR2 of the second sub pixel SP2 is turned off in response to the logic low scan signal provided through the second scan line SL2. When the first switching transistor M1 comprised in the first pixel driver DR1 of the second sub pixel SP1 is turned off, the positive data voltage stored in the first capacitor C1 is provided to the gate electrode of the first driving transistor T1. Accordingly, the first driving transistor T1 comprised in the pixel driver DR1 is operated in response to the positive data voltage and the first organic light emitting diode OLED1 emits light.

That is, the first sub pixel SP1 performs a compensation operation according to the first pixel driver DR1 thereof and the second sub pixel SP2 performs a light-emitting operation according to the first pixel driver DR1 thereof in the odd frame period.

Figure 10:
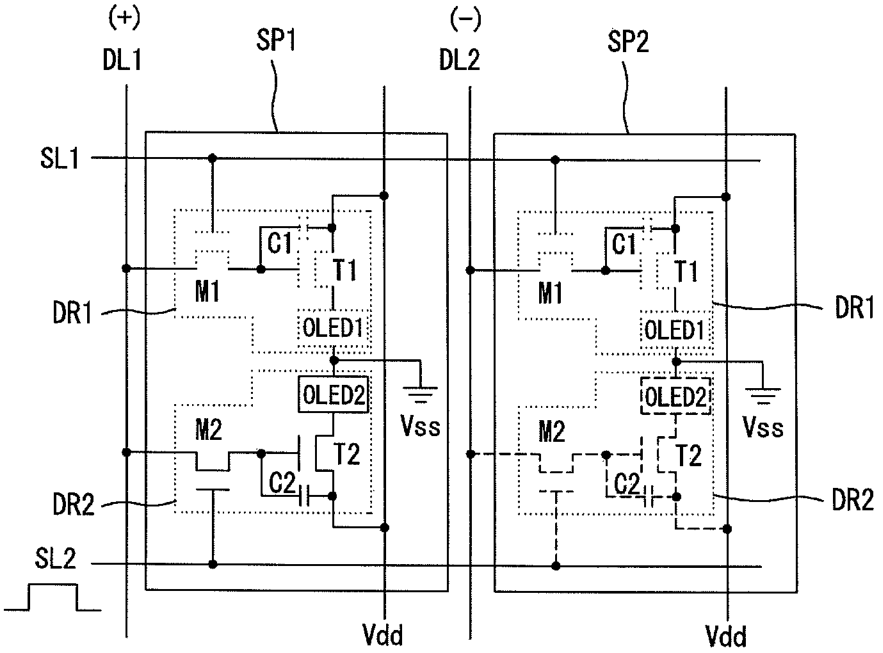

FIG. 10 is a circuit diagram for explaining an operating state when a logic low scan signal is supplied to the first scan line SL1 and a logic high scan signal is provided to the second scan line SL2, which may be defined as an even frame period.

For the even frame period, the first sub pixel SP1 receives the positive data signal (+) through the first data line DL1 and the second sub pixel SP2 receives the negative data signal (−) through the second data line DL2.

The first switching transistor M1 comprised in the first pixel driver DR1 of the first sub pixel SP1 is turned off in response to the logic low scan signal provided through the first scan line SL1 whereas the second switching transistor M2 comprised in the second pixel driver DR2 of the first sub pixel SP1 is turned on in response to the logic high scan signal provided through the second scan line SL2. Then, the positive data signal (+) supplied through the first data line DL1 is transferred through the second switching transistor M2 and stored as a positive data voltage in the second capacitor C2. When the second switching transistor M2 comprised in the second pixel driver DR2 of the first sub pixel SP1 is turned off, the positive data voltage stored in the second capacitor C2 is provided to the gate electrode of the second driving transistor T2. Accordingly, the second driving transistor T2 comprised in the second pixel driver DR2 is operated in response to the positive data voltage and the second organic light emitting diode OLED2 emits light.

The first switching transistor M1 comprised in the first pixel driver DR1 of the second sub pixel SP2 is turned off in response to the logic low scan signal provided through the first scan line SL1 whereas the second switching transistor M2 comprised in the second pixel driver DR2 of the second sub pixel SP2 is turned on in response to the logic high scan signal provided through the second scan line SL2. Then, the negative data signal (−) supplied through the second data line DL2 is transferred through the second switching transistor M2 and stored as a negative data voltage in the second capacitor C2. When the second switching transistor M2 comprised in the second pixel driver DR2 of the second sub pixel SP2 is turned off, the negative data voltage stored in the second capacitor C2 is provided to the gate electrode of the second driving transistor T2. Accordingly, the second driving transistor T2 comprised in the second pixel driver DR2 compensates for the threshold voltage thereof in response to the negative data voltage and the second organic light emitting diode OLED2 does not emit light.

That is, the first sub pixel SP1 performs a light-emitting operation according to the second pixel driver DR2 thereof and the second sub pixel SP2 performs a compensation operation according to the second pixel driver DR2 thereof in the even frame period.

As described above, the organic light emitting display can make organic light emitting diodes emit lights by using polarity changing characteristic of a data driver used in a liquid crystal display and compensate for a threshold voltage of a driving transistor, and thus the degree of freedom of design of the organic light emitting display can be improved. Furthermore, the threshold voltage of the driving transistor can be compensated even while the display panel is driven, and thus a variation in the driving characteristic of the driving transistor can be prevented. Moreover, since at least one organic light emitting diode is driven using at least two pixel circuits, an organic light emitting display capable of improving the display quality and lifetime thereof can be implemented.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An organic light emitting display comprising:

a display panel comprising sub pixels disposed at intersections of data lines and first and second scan lines;

a data driver alternately outputting a positive data signal and a negative data signal to the data lines; and a scan driver respectively outputting a first scan signal and a second scan signal to the first scan lines and the second scan lines, wherein each of the sub pixels comprises a first driving circuit and a second driving circuit which individually drive at least two organic light emitting diodes, and the first driving circuit and the second driving circuit respectively comprise at least one switching transistor, at least one driving transistor, and at least one capacitor, wherein one of the first driving circuit and the second driving circuit performs a light-emitting operation such that the organic light emitting diode corresponding to the one of the first and second driving circuits emits light and the other one compensates for the threshold voltage of the driving transistor.

2. The organic light emitting display of claim 1, wherein the data driver alternately generates the positive data signal and the negative data signal in response to a positive signal and a negative signal supplied from an external device.

3. The organic light emitting display of claim 1, wherein the data driver divides one horizontal period in half and alternately generates the positive data signal and the negative data signal such that the positive data signal corresponds to the first half period and the negative data signal corresponds to the second half period.

4. The organic light emitting display of claim 1, wherein the data driver reverses the polarities of the data signals for every frame.

5. The organic light emitting display of claim 1, wherein the scan driver generates the first scan signal and the second scan signal in response to the positive signal and the negative signal.

6. The organic light emitting display of claim 1, wherein sub pixels provided with the positive data signal emit lights and sub pixels provided with the negative data signal perform a compensation operation.

7. A method of driving an organic light emitting display, comprising:

driving a scan driver to provide a first scan signal and a second scan signal to a display panel including sub pixels disposed at intersections of first scan lines and second scan lines; and driving a data driver to alternately provide a positive data signal and a negative data signal to data lines connected to the sub pixels, wherein the data driver divides one horizontal period in half and alternately generates the positive data signal and the negative data signal such that the positive data signal corresponds to the first half period and the negative data signal corresponds to the second half period, wherein each of the sub pixels comprises a first driving circuit and a second driving circuit which individually drive at least two organic light emitting diodes, and the first driving circuit and the second driving circuit respectively comprise at least one switching transistor, at least one driving transistor, and at least one capacitor, wherein one of the first driving circuit and the second driving circuit performs a light-emitting operation such that the organic light emitting diode corresponding to the one of the first and second driving circuits emits light and the other one compensates for the threshold voltage of the driving transistor.

8. The method of claim 7, wherein the data driver reverses the polarities of the data signals for every frame.

9. The method of claim 7, wherein the scan driver generates the first scan signal and the second scan signal in response to the positive signal and the negative signal.

10. The method of claim 7, wherein sub pixels provided with the positive data signal emit lights and sub pixels provided with the negative data signal perform a compensation operation.

* * * * *